United States Patent [19]

Rockwell et al.

[11] Patent Number: 4,645,869
[45] Date of Patent: Feb. 24, 1987

[54] DIGITIZING TABLET

[75] Inventors: Lynn H. Rockwell, Mesa; Gary S. Dukarich, Scottsdale, both of Ariz.

[73] Assignee: Sanders Associates, Inc., Nashua, N.H.

[21] Appl. No.: 764,031

[22] Filed: Aug. 9, 1985

[51] Int. Cl.$^4$ ............................................. G08C 21/00
[52] U.S. Cl. ........................................ 178/18; 178/19
[58] Field of Search .................... 178/18, 19, 20, 87

[56] References Cited

U.S. PATENT DOCUMENTS 4,451,698 5/1984 Whetstone et al. .................. 178/19

Primary Examiner—Stafford D. Schreyer
Attorney, Agent, or Firm—Richard I. Seligman; William F. Porter, Jr.

[57] ABSTRACT

A flexible circuit (28) containing the grid connectors of a digitizer tablet (10) converge in a transition region (48) disposed in an unshielded area. However, the positional inaccuracies that would otherwise result from the exposure of the non-parallel conductors to radiation from the tablet's stylus (24) are reduced because the flexible circuit (28) is kept in close proximity to a metal plate (32) throughout the transition region (48) in which the conductors depart from a parallel configuration.

14 Claims, 4 Drawing Figures

DIGITIZING TABLET

BACKGROUND OF THE INVENTION

The present invention is directed to digitizer tablets. It particularly concerns digitizer tablets that employ sets of parallel conductors adjacent to the grid surface.

A digitizer tablet is a device for generating signals that indicate the position of a stylus on the grid surface of the tablet. A typical digitizer tablet includes two sets of parallel grid conductors disposed below and parallel to the grid surface. Each set of parallel conductors is perpendicular to the other set. Circuitry inside the digitizer tablet typically drives a coil in the stylus and senses the signals that the driven coil induces in the grid conductors. In the alternative, the grid conductors can be driven in succession and the resultant signals induced in the stylus coil can be sensed. The time of occurence of the stronger signal is then an indication of the location of the stylus.

Although the principles involved in the two types of tablets are the same and the present invention is applicable to both types, we will discuss only the type of tablet in which it is the stylus that generates the signals and the grid conductors that receive them. In this type, operational circuitry senses the signals on each grid conductor in succession and identifies the ones carrying the strongest signals. The conductors in each set carrying the strongest signals are always adjacent to each other, and the circuitry determines the ratio between the strengths of the signals on these two conductors. From this ratio, it determines the position of the stylus between those two conductors.

It is important that the conductors be as parallel to each other as possible so that the resultant signal ratios for a given set of conductors is substantially independent of the longitudinal position of the stylus along that set of conductors. As the stylus gets close to the ends of the conductors, the magnitudes of the signals for a given proximity to a set of conductors changes, but the ratios remain the same so long as the conductors remain parallel. If the conductors depart from a parallel configuration in a region in which they receive radiation from the stylus, however, the ratio will not depend exclusively on the transverse position of the stylus with respect to that set of conductors. This effect detracts from the accuracy of the tablet.

There are several ways of maintaining the required parallelism. One way is to keep the spacing between the buffer amplifiers that receive the grid-conductor signals equal to that of the grid conductors in the sensing region. This keeps the conductors, as well as any switching circuitry that occurs ahead of the amplifiers, at a uniform separation. It is not important that the circuitry beyond the amplifiers be parallel, because that circuitry typically carries higher-amplitude signals and lower impedances. However, this method of maintaining parallelism is not practical, because it requires a separate amplifier for each grid line. Typically, only one or two amplifiers are employed; the signal from only one grid line at a time is amplified, and switches that occur ahead of the amplifier determine which of the grid conductors will be coupled to the amplifier.

Another way of achieving the parallelism is to take advantage of the shield plate that is sometimes placed between the operational circuitry and the grid conductors in the sensing region. The grid conductors are formed on a flexible substrate, which is bent around the edge of the shield so that connections to the operational circuitry can be made beneath the shield. Although the conductors must depart from parallelism to be connected to the operational circuitry, this departure occurs below the shield, which ordinarily prevents radiation from the stylus from reaching the parallel portions of the conductors.

Although this arrangement is reasonably effective and avoids the need to provide a large number of amplifiers, it can still be subject to erroneous readings as the stylus is brought near the edge of the shield and some radiation therefore finds its way to the conductors beneath the shield.

One way to eliminate this problem is to employ a further shield in the form, for instance, of the type of shield box that is often required by FCC regulations in order to prevent propagation of regulated-frequency radio waves beyond the immediate vicinity of the operational circuitry. By placing the parallel portions of the conductors inside the box, exclusion of stylus-induced radiation from the parallel parts of the grid conductors can be assured. However, this type of an arrangement still has certain disadvantages. In particular, since the conductors must remain parallel at all points outside the shield box, the shield box must be made larger than the effective sensing area of the tablet if it is to provide openings large enough to allow the conductors to enter the box; the digitizer tablet thus becomes excessively large.

It is accordingly an object of the present invention to avoid the erroneous readings that can result from exposure of parallel portions of the grid conductors but at the same time to permit the digitizer size to be kept to a minimum.

SUMMARY OF THE INVENTION

According the present invention, the grid conductors are permitted to converge outside of the shield region. The opening that must be provided to admit them to the shield region is smaller than it would be if the conductor remained parallel, so the shield box can be smaller, too. Although the convergence results in the conductors' being non-parallel in a transition region that is located outside of the shielded area and that can thus be reached by radiation from the stylus, the conductors are kept in close proximity to a conductive plate, typically the outer wall of the shield box, and this prevents signals from being induced in the conductors by the radiation from the stylus. Accordingly, the digitizer tablet can be made compact without sacrificing the accuracy that results from uniform spacing in the region subject to electromagnetic coupling with the stylus.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

Figure 1:
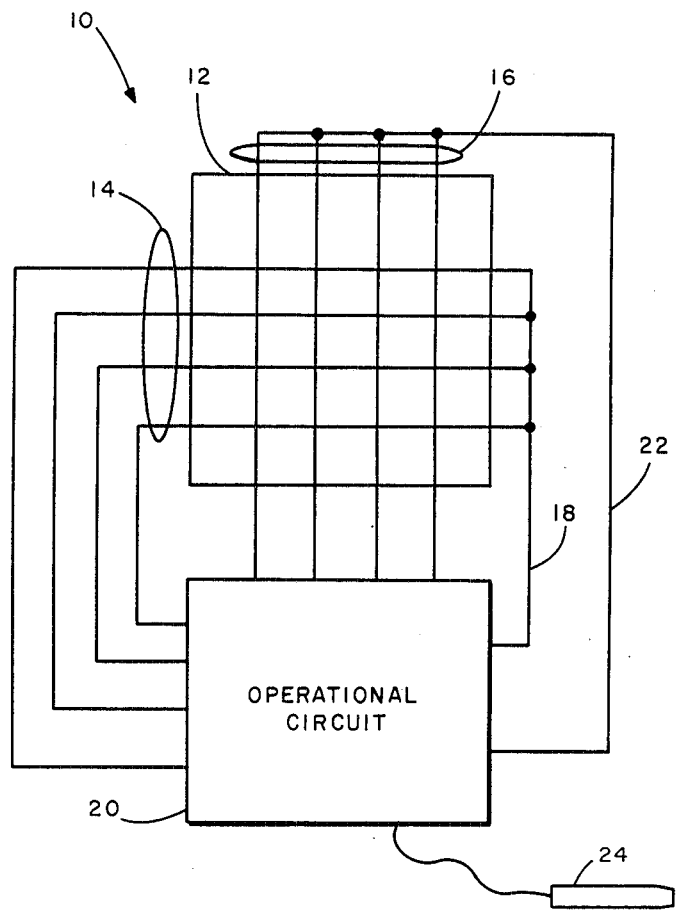
FIG. 1 is a schematic diagram of a digitizer tablet of the type in which the teachings of the present invention can be employed.

FIG. 1 depicts a typical digitizer tablet 10 having a grid surface 12. The tablet 10 has first and second sets of parallel conductors 14 and 16 running perpendicular to each other below the grid surface 12. All of the conductors of the first conductor set 14 are connected at one end to a common line 18, which connects to the operational circuit 20. The other ends of those conductors are connected individually to the operational circuit 20, which includes a switch for each of the conductors to select the conductor whose signals will be sensed. Similarly, the conductors of the second conductor set 16 are connected by a second common line 22 to the operational circuit 20, and they are connected individually at their other ends to that circuit.

Also connected to the operational circuit 20 is a stylus 24. The operational circuitry 20 drives a coil located in the tip of the stylus to cause it to transmit electromagnetic radiation. When the stylus 24 is brought to the grid surface 12, it induces electromotive force in the conductors of the first and second sets 14 and 16. The operational circuit senses the signals on each of the conductors in succession to determine which conductors carry the strongest signals. The greatest electromotive force is generated in the conductors to which the stylus 24 is closest, and the operational circuit 20 determines the ratios of the signal strengths of the two strongest signals in each set of conductors 14 and 16 and from this determines the position of the stylus. In response, it generates position-indicating output signals on lines not shown.

Figure 2:
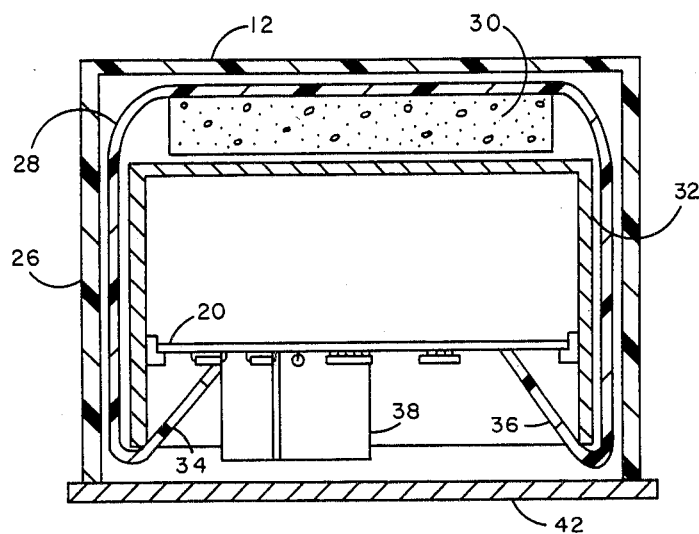
FIG. 2 is a cross-sectional view of a digitizer tablet in which the teachings of the present invention are employed.
Figure 3:
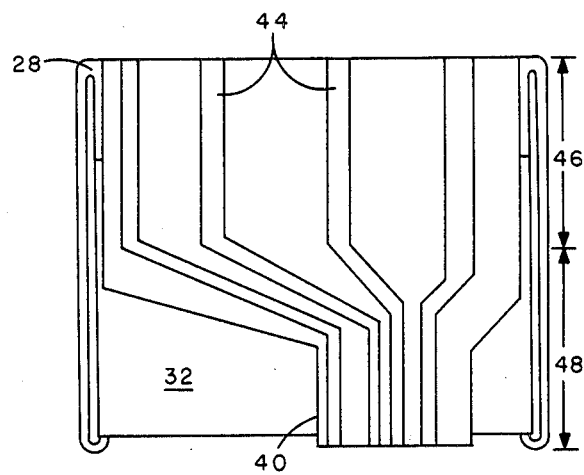
FIG. 3 is a front elevation of the digitizer tablet of FIG. 2 with the casing removed.

FIGS. 2 and 3 illustrate an advantageous arrangement incorporating the teachings of the present invention. The grid surface 12 is provided on a plastic outer case 26. A flexible circuit 28 made of a Mylar sheet carrying the conductors on its outer surface is draped over a spacer 30, typically of some type of sponge material, that separates the portions of the conductors beneath the grid surface 12 from the upper wall of a shield box 32 in which the operational circuitry 20 is mounted. The flexible circuit 28 extends down around the side walls of the shield box 32 to end in four narrowed tail portions 34, 36, 38, and 40. These tail portions extend underneath the lower edge of the metal box 32 and are connected to the operational circuit 20. A lower metal plate 42 is connected to the outer case 26 and cooperates with the inner metal shield box 32 to prevent radiation of regulated-frequency radio waves.

As can best be appreciated by reference to FIG. 3, the conductors 44 continue their parallel configuration for a distance indicated by arrow 46 down the side of the shield box 32. However, they ultimately begin to converge in a transition region 48 and so allow the flexible circuit 28 to narrow into tail 40. A similar convergence of the other set of grid conductors permits narrowing into tail 36. Throughout this transition region, the flexible circuit 28 is positioned flush against the side wall of the shield box 32. We have found that this reduces the sensitivity of the conductors to radiation generated by the stylus 24. The reduction is enough that the transition region 48 can be located in an outer, unshielded region. As a result, the opening used to permit entry of the conductors into the shield interior can be relatively small, so the upper surface of the shield box 32 does not have to be any larger than the sensing surface covered by the conductors.

Figure 4:
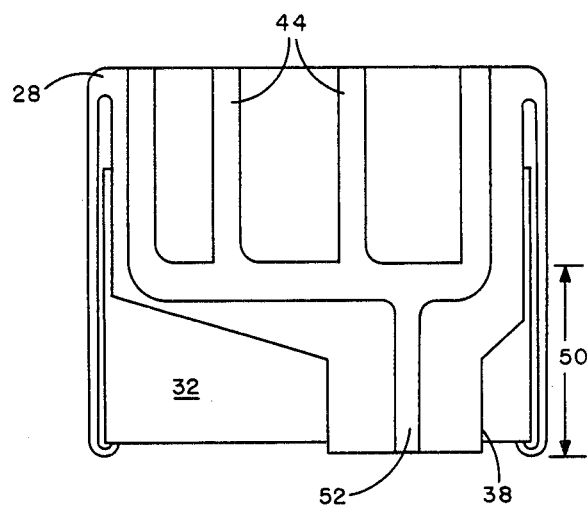
FIG. 4 is a rear elevation of the digitizer tablet of FIG. 2 with the casing removed.

FIG. 4 depicts a transition region 50 on the other side of the grid from transition region 48. In transition region 50, the conductors 44 join together in a common line 52 that extends along tail 38 for connection to the operational circuit. Like the portion of the flexible circuit in transition region 48, the portion in transition region 52 is flush against the side wall of the shield box 32. A similar configuration is provided on tail 34.

Although we prefer for the flexible circuit to be flush against the wall of the shield box 32 so that the separation between the shield wall and the conductors in the transition region is only the 0.003-inch (0.008-cm) thickness of the Mylar on which the conductors are printed, the conductors do not have to be that close. It is important only that the conductors in the transition region be kept relatively close to some type of conductive plate whose area is large in comparison to that of the total conductor area in the transition region. The spacing should be close enough that any coupling between the stylus and the conductors in the transition region is negligible in comparison with their coupling in the sensing region. More specifically, we believe that the spacing of the conductors from such a plate in the transition region should be less than one-fifth of the distance of that transition region from the grid surface 12, where the stylus operates. In the illustrated embodiment, the sensing region covers the entire grid surface 12. The distance 40 of the transition region from the grid surface 12 is 0.3 inch (0.8 centimeter), so the separation of the conductive plate (the wall of the shield box 32) from the conductors is only 1/100 of the distance of the transition region from the sensing region. As was stated above, the separation could be greater than this, but the results would not be quite as good.

In light of the foregoing description, it is apparent that the teachings of the present invention can increase the accuracy of the digitizer tablet without requiring an increase in its size. It thus represents a significant advance in the art.

We claim:

1. In a digitizer tablet having a stylus and a planar grid surface, a set of parallel grid conductors extending parallel and closely adjacent to the grid surface throughout a sensing region thereof, an operational circuit connected to the stylus and the grid conductors for driving one of the stylus and the set of grid conductors and sensing the resultant signals induced in the other of the stylus and grid conductors and generating location signals indicating the position of the stylus with respect to the grid surface, the improvement wherein the grid conductors depart from their parallel configuration in an unshielded transition region outside the sensing region and the digitizer table further includes a conductive plate defining part of a shield surrounding the operational circuit and excluding from the operationsl circuit radiation generated by the stylus or the grid conductors, the transition region being located outside the shield, and the grid conductors extending inside the shield for connection to the operational circuit, the conductive plate being disposed close enough to the grid conductors in the unshielded transition region to cause any coupling between the stylus and the conductors in the transition region to be negligible in comparison with their coupling in the sensing region.

2. A digitizer tablet as defined in claim 1 wherein the grid conductors of the parallel set thereof are connected to a common line in a second unshielded transition region on the other side of the sensing region from the first-mentioned transition region and wherein the shield includes a second conductive plate disposed close enough to the common line in the second transition region to cause any coupling between the stylus and the common line in the transition region to be negligible in comparison with the coupling of the stylus to the grid conductors in the sensing region.

3. A digitizer tablet as defined in claim 1 wherein the grid conductors of the parallel set thereof are connected to a common line in a second unshielded transition region on the other side of the sensing region from the first-mentioned transition region and wherein the digitizer tablet includes a second conductive plate disposed close enough to the common line in the second transition region to cause any coupling between the stylus and the common line in the transition region to be negligible in comparison with the coupling of the stylus to the grid conductors in the sensing region.

4. A digitizer tablet as defined in claim 1 further including a second set of parallel grid conductors extending perpendicular to the grid conductors of the first set and parallel and closely adjacent to the grid surface throughout the sensing region, the operational circuit being connected to the second set of grid conductors for driving one of the stylus and both sets of grid conductors and sensing the resultant signals induced in the other of the stylus and grid conductors and generating location signals indicating the position of the stylus with respect to the grid surface, wherein the grid conductors of the second set depart from their parallel configuration in an unshielded second-set transition region outside the sensing region and the digitizer tablet includes a second-set conductive plate disposed close enough to the grid conductors of the second set in the unshielded second-set transition region to cause any coupling between the stylus and the conductors in the second-set transition region to be negligible in comparison with their coupling in the sensing region.

5. A digitizer tablet as defined in claim 4 wherein the first-mentioned and second-set conductive plates are part of a shield surrounding the operational circuit and excluding from the operational circuit radiation generated by the stylus or the grid conductors, the first-mentioned and second-set transition regions are located outside the shield, and the grid conductors extend inside the shield for connection to the operational circuit.

6. A digitizer tablet as defined in claim 5 wherein the grid conductors of the first and second sets thereof are connected to first and second common lines, respectively, in second unshielded first-set and second-set transition regions, respectively, on the other sides of the sensing region from the first-mentioned first-set and second-set transition regions and wherein the shield includes second first-set and second-set conductive plates disposed close enough to the first and second common lines, respectively, in the second first-set and second-set transition regions to cause any coupling between the stylus and the common lines in the second first-set and second-set transition regions to be negligible in comparison with the coupling of the stylus to the grid conductors in the sensing region.

7. A digitizer tablet as defined in claim 5 wherein the grid conductors of the first and second sets thereof are connected to first and second common lines, respectively, in second unshielded first-set and second-set transition regions, respectively, on the other sides of the sensing region from the first-mentioned first-set and second-set transition regions and wherein the digitizer tablet includes second first-set and second-set conductive plates disposed close enough to the first and second common lines, respectively, in the second first-set and second-set transition regions to cause any coupling between the stylus and the common lines in the second first-set and second-set transition regions to be negligible in comparison with the coupling of the stylus to the grid conductors in the sensing region.

8. In a digitizer tablet having a stylus and a planar grid surface, a set of parallel grid conductors extending parallel and closely adjacent to the grid surface throughout a sensing region thereof, an operational circuit connected to the stylus and the grid conductors for driving one of the stylus and the set of grid conductors and sensing the resultant signals induced in the other of the stylus and grid conductors and generating location signals indicating the position of the stylus with respect to the grid surface, the improvement wherein the grid conductors depart from their parallel configuration in an unshielded transition region outside the sensing region and the digitizer tablet further includes a conductive plate disposed close enough to the grid conductors in the unshielded transistion region that the conductors in the transition region are spaced from the conductive plate by less than one-fifth the distance of the transition region from the sensing region, the conductive plate defining part of a shield surrounding the operational circuit and excluding from the operational circuit radiation generated by the stylus or the grid conductors, the transition region being located outside the shield, and the grid conductors extending inside the shield for connection to the operational circuit.

9. A digitizer tablet as defined in claim 8 wherein the grid conductors of the parallel set thereof are connected to a common line in a second unshielded transition region on the other side of the sensing region from the first-mentioned transition region and wherein the shield includes a second conductive plate disposed close enough to the common line in the second transition region that the conductors in the transition region are spaced from the conductive plate by less than one-fifth the distance of the transition region from the sensing region.

10. A digitizer tablet as defined in claim 8 wherein the grid conductors of the parallel set thereof are connected to a common line in a second unshielded transition region on the other side of the sensing region from the first-mentioned transition region and wherein the digitizer tablet includes a second conductive plate disposed close enough to the common line in the second transition region that the conductors in the transition region are spaced from the conductive plate by less than one-fifth the distance of the transition region from the sensing region.

11. A digitizer tablet as defined in claim 1 further including a second set of parallel grid conductors extending perpendicular to the grid conductors of the first set and parallel and closely adjacent to the grid surface throughout the sensing region, the operational circuit being connected to the second set of grid conductors for driving one of the stylus and both sets of grid conductors and sensing the resultant signals induced in the other of the stylus and grid conductors and generating location signals indicating the position of the stylus with respect to the grid surface, wherein the grid conductors of the second set depart from their parallel configuration in an unshielded second-set transistion region outside the sensing region and the digitizer tablet includes a second-set conductive plate disposed close enough to the grid conductors of the second set in the unshielded second-set transition region that the conductors in the transition region are spaced from the conductive plate by less than one-fifth the distance of the transition region from the sensing region.

12. A digitizer tablet as defined in claim 11 wherein the first-mentioned and second-set conductive plates are part of a shield surrounding the operational circuit and excluding from the operational circuit radiation generated by the stylus or the grid conductors, the first-mentioned and second-set transition regions are located outside the shield, and the grid conductors extend inside the shield for connection to the operational circuit.

13. A digitizer tablet as defined in claim 5 wherein the grid conductors of the first and second sets thereof are connected to first and second common lines, respectively, in second unshielded first-set and second-set transition regions, respectively, on the other sides of the sensing region from the first-mentioned first-set and second-set transition regions and wherein the shield includes second first-set and second-set conductive plates disposed close enough to the first and second common lines, respectively, in the second first-set and second-set transition regions that the conductors in the transition region are spaced from the conductive plate by less than one-fifth the distance of the transition region from the sensing region.

14. A digitizer tablet as defined in claim 12 wherein the grid conductors of the first and second sets thereof are connected to first and second common lines, respectively, in second unshielded first-set and second-set transition regions, respectively, on the other sides of the sensing region from the first-mentioned first-set and second-set transition regions and wherein the digitizer tablet includes second first-set and second-set conductive plates disposed close enough to the first and second common lines, respectively, in the second first-set and second-set transition regions to cause any coupling between the stylus and the common lines in the second first-set and second-set transition regions that the conductors in the transition region are spaced from the conductive plate by less than one-fifth the distance of the transition region from the sensing region.

* * * * *